United States Patent
Li et al.

(10) Patent No.: US 11,217,826 B2
(45) Date of Patent: Jan. 4, 2022

(54) METHODS OF MAKING SULFIDE-IMPREGNATED SOLID-STATE BATTERY

(71) Applicant: GM Global Technology Operations LLC, Detroit, MI (US)

(72) Inventors: Zhe Li, Shanghai (CN); Xiaochao Que, Shanghai (CN); Haijing Liu, Shanghai (CN); Yong Lu, Shanghai (CN); Mark W. Verbrugge, Troy, MI (US); Meiyuan Wu, Shanghai (CN)

(73) Assignee: GM Global Technology Operations LLC, Detroit, MI (US)

(*) Notice: Subject to any disclaimer, the term of this patent is extended or adjusted under 35 U.S.C. 154(b) by 12 days.

(21) Appl. No.: 16/578,872

(22) Filed: Sep. 23, 2019

(65) Prior Publication Data
US 2021/0036373 A1 Feb. 4, 2021

(30) Foreign Application Priority Data
Jul. 29, 2019 (CN) .......................... 201910689289.5

(51) Int. Cl.
*H01M 10/0585* (2010.01)
*H01M 10/0562* (2010.01)
*H01M 10/0525* (2010.01)

(52) U.S. Cl.
CPC ... *H01M 10/0585* (2013.01); *H01M 10/0525* (2013.01); *H01M 10/0562* (2013.01); *H01M 2300/0068* (2013.01)

(58) Field of Classification Search
CPC ......... H01M 10/0585; H01M 10/0562; H01M 10/0525; H01M 10/052; H01M 2300/0068
See application file for complete search history.

(56) References Cited

U.S. PATENT DOCUMENTS

2020/0350633 A1* 11/2020 Busacca ................. H01M 4/38

OTHER PUBLICATIONS

Sakuda, "Sulfide Solid Electrolyte with Favorable Mechancial Property for All-Solid-State Lithium Battery," Scientific Reports, 2013.*

* cited by examiner

*Primary Examiner* — Matthew T Martin
(74) *Attorney, Agent, or Firm* — Vivacqua Crane PLLC

(57) ABSTRACT

A method of making the sulfide-impregnated solid-state battery is provided. The method comprises providing a cell core that is constructed by cell unit. The cell core is partially sealed into the packaging such as the Al laminated film and metal can. The method further comprises introducing a sulfide solid-state electrolyte (S-SSE) precursor solution in the cell core, the S-SSE precursor solution comprises a sulfide solid electrolyte and a solvent. The method further comprises evaporating the solvent from the cell core to dry the cell core to solidify the sulfide-based solid-state electrolyte within the cell core and pressurizing the cell core to densify the solid sulfide-base electrolyte within the cell core. The cell core is then fully sealed.

7 Claims, 6 Drawing Sheets

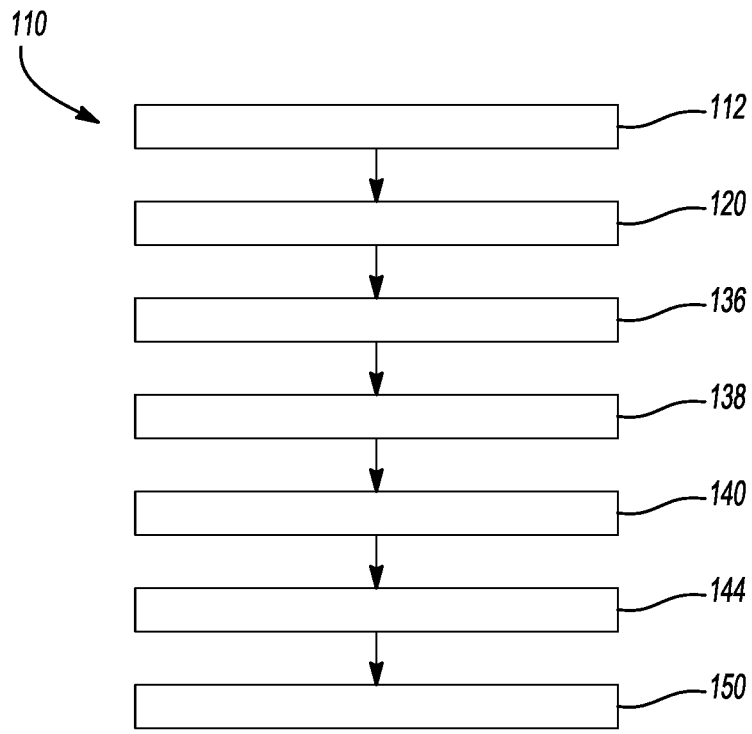
FIG. 8
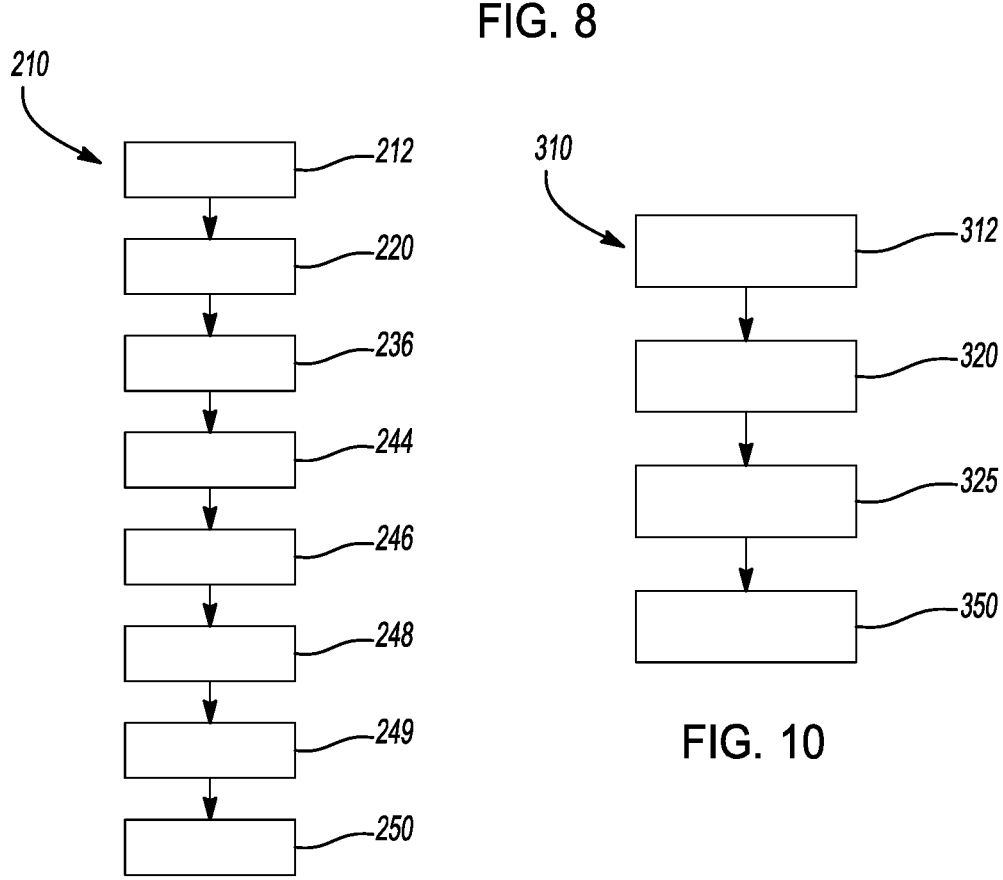
FIG. 9
FIG. 10

METHODS OF MAKING SULFIDE-IMPREGNATED SOLID-STATE BATTERY

INTRODUCTION

The present disclosure relates to rechargeable solid-state batteries and, more particularly, methods of making sulfide-impregnated solid-state batteries.

With the rapid popularization of information-related devices, communication devices, and so on, the importance of developing batteries that can be used as power supplies for these devices has grown. Moreover, in the automobile industry, the development of high-power-output, large-energy-density batteries that can be used in electric automobiles or hybrid automobiles is progressing. Among the various types of batteries that currently exist, lithium-ion batteries are one focus of attention due to a favorable power density (fast charging/discharging performance), a high energy density, a long cycle life, and an ability to be formed into a wide variety of shapes and sizes so as to efficiently fill available space in electric vehicles, cellular phones, and other electronic devices. However, those commercialized lithium-ion batteries are generally employing flammable organic liquid electrolyte which may result in undesirable risks.

Driven by enhancing the battery safety, organic liquid electrolytes have been considered to be replaced by non-flammable solid-state electrolyte (SSE), which can also endow lithium-ion batteries with wide working temperature range, high energy density, simple cell packaging and so on. Among various SSEs, sulfide-based solid-state electrolyte (S-SSE) has attracted increasing attention due to its high conductivity, soft mechanical strength and great potential to be an enabling material for high-power-type solid-state battery (SSB). Although many advances have been achieved in sulfide-based solid-state battery (S-SSB), challenges in S-SSB fundamental science, manufacturing and large-scale production still exist. For example, a critical issue in current S-SSB manufacturing (e.g., wet-coating process) is related to high sensitivity of S-SSE to moisture, where S-SSE may react with $H_2O$ molecules which may be undesirable. In this regard, ambient atmosphere is tightly controlled in each step of manufacturing, which may increase the manufacturing cost. In addition, for current methods of S-SSB manufacturing, the distribution of active materials and S-SSEs within the electrode is relatively inhomogeneous with improvable electrode-electrolyte interface, and the selections of solvent, binder and their combination are relatively limited.

SUMMARY

According to several aspects, a method of making a sulfide-impregnated solid-state battery is provided. For typical sulfide-based solid-state battery (S-SSB) manufacturing, sulfide-based solid-state electrolyte (S-SSE) will be mixed with active material in solvent to form the slurry, which is followed by slurry coating, electrode drying, electrode stacking and cell sealing. If the moisture control is not good, S-SSE will react with $H_2O$, and generate toxic $H_2S$. Hence, the moisture content in environment must be tightly controlled in each step of the manufacturing. In the method of making a sulfide-impregnated solid-state battery, S-SSE will be involved from being dissolved into solvent to form the precursor solution, followed by its impregnation into as-formed cell core. This method will maximally rely on conventional lithium-ion battery manufacturing, and the moisture content in environment do not need to tightly control because the S-SSE dissolved in solvent could not directly contact with the moister in environmental. As a result, the method of making a sulfide-impregnated solid-state battery is low-cost and toxic-free. The method comprises providing a cell core, which is fabricated based on conventional lithium-ion battery manufacturing system and process. The cell core is constructed by basic cell units. Each cell unit has a positive electrode including a cathode layer and a positive current collector. The cell unit further has a negative electrode including an anode layer and a negative current collector. The cell unit further has a separator layer disposed between the positive electrode and the negative electrode. For example, the separator being a permeable oxide-based film. Such basic cell unit may be repeated/connected in parallel or in series (namely, bipolar stacking) to form a cell core to achieve a desired battery voltage, power and energy. The cell core is further partially sealed into the packaging such as the Al laminated film and metal can.

The method further comprises introducing a sulfide-based solid-state electrolyte (S-SSE) precursor solution into the above cell core. During this step, the precursor solution will be absorbed into the pore structures of the electrodes and separator layers due to capillary force. The S-SSE precursor solution comprises a sulfide-based solid-state electrolyte and a solvent. The method further includes evaporating the solvent from the cell core to dry the cell core to in-situ solidify the sulfide-based solid-state electrolyte within the cell core. During the solvent evaporation, the S-SSE will be precipitated out and directly grown onto the surface of electrode particles. Hence, an intimate solid-solid electrode-electrolyte interface will be built up, which will be beneficial to effectively improve the cell performance. The method further comprises pressurizing the cell core to densify the solid sulfide-base electrolyte within the cell core and fully sealing the cell core.

In this aspect, the cell core may be comprised of a plurality of cell units that connected in series, that is bipolar-stacked battery cell core. In bipolar-stacked battery cell core, only the outermost current collectors in the cell core have tabs extending from their top sides. The outermost current collectors are indicated as either positively charged or negatively charged. The other current collectors in the cell core are shared by both cathode and anode layers. In another aspect, the cell core may be comprised of a plurality of cell units that connected in parallel. In parallel-stacked battery cell core, all the current collectors have tabs extending from their top sides. The first and third current collectors (staring from left) are electrically connected and indicated as positively charged as they would be during discharge of solid-state battery cell module. The second and fourth current collectors are electrically connected and indicated as negatively charged. Moreover, the introducing step may comprise one of injecting the sulfide solid-state electrolyte precursor solution in the cell core or dipping the cell core into the S-SSE precursor solution. In this aspect, the S-SSE precursor solution comprises a concentration of about 0.001 g/mL to about 20 g/mL of the sulfide-based solid-state electrolyte.

In another aspect, the sulfide solid electrolyte precursor solution may comprise at least one of a pseudobinary sulfide with solvent, a pseudoternary sulfide with solvent, and a pseudoquaternary sulfide with solvent. The pseudobinary sulfide with solvent may comprise one of $Li_3PS_4$, and $Li_7P_3S_{11}$, $Li_4SnS_4$, and $80Li_2S \cdot 20P_2S_5$ with solvent of tetrahydrofuran, ethylacetate, acetonitrile, water or N-methyl formamide. Moreover, the pseudoternary sulfide with solvent may comprise one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI$—$Li_4SnS_4$ with solvent of hydrazine, ethanol, tetrahydrofuran, acetonitrile, 1,2-dimethoxyethane or methanol. Additionally, the pseudoquaternary sulfide with solvent may comprise one of $Li_{9.54}Si_{1.74}P_{1.44}S_{11.7}O_{10.3}$ and $Li_{10.35}[Sn_{0.27}Si_{1.08}]P_{1.65}S_{12}$ with solvent of ethanol, tetrahydrofuran, acetonitrile or methanol. In another example, the S-SSE precursor solution comprises $Li_{10}GeP_2S_{12}$, a polyethylene oxide and an acetonitrile solvent. In some examples, to improve the S-SSE dispersibility, some dispersant (such as Triton X-100) are further added into S-SSE precursor solution.

In accordance with another example, the step of evaporating solvent comprises heating the cell core between about 60 degC and about 600 degC under vacuum for about 30 minutes to about 120 hrs.

In another aspect, the step of pressurizing comprises pressurizing the cell core between about 2 MPa and about 800 MPa at about 100 to about 300 C for about 2 min to about 12 hrs.

In yet another example, after the step of evaporating, the method further comprises introducing the sulfide solid-state electrolyte (S-SSE) precursor solution to the cell core and evaporating the solvent from the cell core to dry the cell core to solidify the sulfide-based solid-state electrolyte within the cell core.

In yet another aspect, after the step of pressurizing, the method further comprises introducing the sulfide solid-state electrolyte (S-SSE) precursor solution to the cell core, evaporating the solvent from the cell core to dry the cell core to solidify the sulfide-based solid-state electrolyte within the cell core, and pressurizing the cell core to densify the cell core to densify the solid sulfide-base electrolyte within the cell core.

In accordance with several other aspects, a sulfide-impregnated solid-state battery is provided. The battery comprises a cell core that is constructed by basic cell units. The cell unit has a positive electrode including a cathode layer and a positive current collector. The cell unit further has a negative electrode including an anode layer and a negative current collector. The cell unit further has a separator layer disposed between the positive electrode and the negative electrode. For example, the separator being a permeable oxide-based film. Such basic cell unit may be repeated/connected in parallel or in series (namely, bipolar stacking) to form a cell core to achieve a desired battery voltage, power and energy. Furthermore, the battery further comprises a densified sulfide-based solid-state electrolyte dispersed in pore structure of the cathode layer, the anode layer, and the separator layer.

In one aspect, the cell core may be comprised of a plurality of cell units that connected/repeated in series, that is, bipolar-stacked battery cell core. In bipolar-stacked battery cell core, only the outermost current collectors in the cell core have tabs extending from their top sides. The outermost current collectors are indicated as either positively charged or negatively charged. The other current collectors in the cell core are shared by both cathode and anode layers. In another aspect, the cell core may be comprised of a plurality of cell units that connected in parallel. In parallel-stacked battery cell core, all the current collectors have tabs extending from their top sides. The first and third current collectors (staring from left) are electrically connected and indicated as positively charged as they would be during discharge of solid-state battery cell module. The second and fourth current collectors are electrically connected and indicated as negatively charged. The electrode current collector has a thickness of between about 4 micrometers and about 100 micrometers.

In another example, the cathode layer comprises between about 30 wt % and about 98 wt % cathode active material, between about 0 wt % and about 50 wt % solid electrolyte, between about 0 wt % and about 30 wt % conductive additive, and between about 0 wt % and about 20 wt % binder. Moreover, the anode layer comprises between about 30 wt % and about 98 wt % anode active material, between about 0 wt % and about 50 wt % solid electrolyte, between about 0 wt % and about 30 wt % conductive additive, and between about 0 wt % and about 20 wt % binder. Each of the cathode layer and the anode layer may have a thickness of between about 1 micrometer and about 1000 micrometers.

In another aspect, the cathode active material comprises at least one of $LiNi_{0.5}Mn_{1.5}O_4$, $LiNbO_3$-coated $LiNi_{0.5}Mn_{1.5}O_4$, $LiCoO_2$, $LiNi_xMn_yCo_{1-x-y}O_2$, $LiNi_xMn_{1-x}O_2$, $Li_{1+x}MO_2$, $LiMn_2O_4$, $LiV_2(PO_4)_3$, or mixtures thereof. Moreover, the anode active material may comprise at least one of carbonaceous material, silicon, silicon mixed with graphite, $Li_4Ti_5O_{12}$, transition-metal, metal oxide/sulfide, or mixtures thereof.

In another example, the sulfide solid electrolyte comprises at least one of a pseudobinary sulfide, a pseudoternary sulfide, and a pseudoquaternary sulfide. The pseudobinary sulfide may include one of $Li_3PS_4$, $Li_7P_3S_{11}$, $Li_4SnS_4$, and $80Li_2S.20P_2S_5$. The pseudoternary sulfide may include one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI$—$Li_4SnS_4$. The pseudoquaternary sulfide may include one of $Li_{9.54}Si_{1.74}P_{1.44}S_{11.7}O_{10.3}$ and $Li_{10.35}[Sn_{0.27}Si_{1.08}]P_{1.65}S_{12}$.

In accordance with yet another aspect, a method of making a sulfide-impregnated solid-state battery is provided. The method comprises providing a cell core that constructed by basic cell units. The cell unit has a positive electrode having a cathode layer and a positive current collector. The cathode layer comprises between about 30 wt % and about 98 wt % cathode active material, between about 0 wt % and about 50 wt % solid electrolyte between about 0 wt % and about 30 wt % conductive additive, and between about 0 wt % and about 20 wt % binder.

In this aspect, the cell unit having a negative electrode comprising anode layer and a negative current collector. The anode layer comprises between about 30 wt % and about 98 wt % anode active material, between about 0 wt % and about 50 wt % solid electrolyte, between about 0 wt % and about 30 wt % conductive additive, and between about 0 wt % and about 20 wt % binder. The cell core further comprises a separator layer disposed between the positive electrode and the negative electrode. The separator may be comprised of a permeable oxide-based film; Such basic cell unit may be repeated/connected in parallel or in series (namely, bipolar stacking) to form a cell core to achieve a desired battery voltage, power and energy. The cell core is further partially sealed into the packaging such as the Al laminated film and metal can.

Further to this aspect, the method further comprises introducing a sulfide-based solid-state electrolyte (S-SSE) precursor solution in the cell core. The S-SSE precursor solution comprises a sulfide solid electrolyte and a solvent. In some embodiments, a solvent may comprise at least one of a tetrahydrofuran, ethyl propionate, ethylacetate, acetonitrile, water, N-methyl formamide, methanol, ethanol, and 1,2-dimethoxyethane. In some embodiment, a co-solvent may be used, such as ethanol and tetrahydrofuran. In this example, the sulfide solid electrolyte comprises at least one of a pseudobinary sulfide, a pseudoternary sulfide, and a pseudoquaternary sulfide. The pseudobinary sulfide may comprise one of $Li_3PS_4$, $Li_7P_3S_{11}$, $Li_4SnS_4$, and $80Li_2S.20P_2S_5$. The pseudoternary sulfide may comprise one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI-Li_4SnS_4$. Moreover, the pseudoquaternary sulfide may comprise one of $Li_{9.54}Si_{1.74}P_{1.44}S_{11.7}Cl_{0.3}$ and $Li_{10.35}[Sn_{0.27}Si_{1.08}]P_{1.65}S_{12}$.

In this aspect, the method further comprises evaporating the solvent from the cell core between about 60 degC and about 600 degC under vacuum for about 30 minutes to about 120 hours to dry the cell core and solidify the sulfide-based solid-state electrolyte within the cell core. It is understood that evaporating the solvent from the cell core may occur under no vacuum. The method further comprises pressurizing the cell core between about 2 MPa and about 800 MPa at about 100 to about 300 C for about 2 minutes to about 12 hours to densify the solid sulfide-base electrolyte within the cell core and fully sealing the cell core.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 6a is a cross-sectional view of a conceptual image of the cell core after the step of evaporating in FIG. 5.

FIG. 6b is an exploded cross-sectional view of a conceptual image of the cell core of FIG. 6a.

FIG. 7a is a cross-sectional view of a conceptual image of the cell core of FIG. 6a after a densification step.

FIG. 7b is an exploded cross-sectional view of a conceptual image of the cell core of FIG. 7a.

FIG. 8 is a flowchart depicting a method of preparing a sulfide-impregnated solid-state battery in accordance with another example of the disclosure.

FIG. 9 is a flowchart depicting yet another method of preparing a sulfide-impregnated solid-state battery in accordance with another example of the disclosure.

FIG. 10 is a flowchart depicting still another method of preparing a sulfide-impregnated solid-state battery in accordance with another example.

DETAILED DESCRIPTION

The following description is merely exemplary in nature and is not intended to limit the present disclosure, application, or uses.

Figure 1:
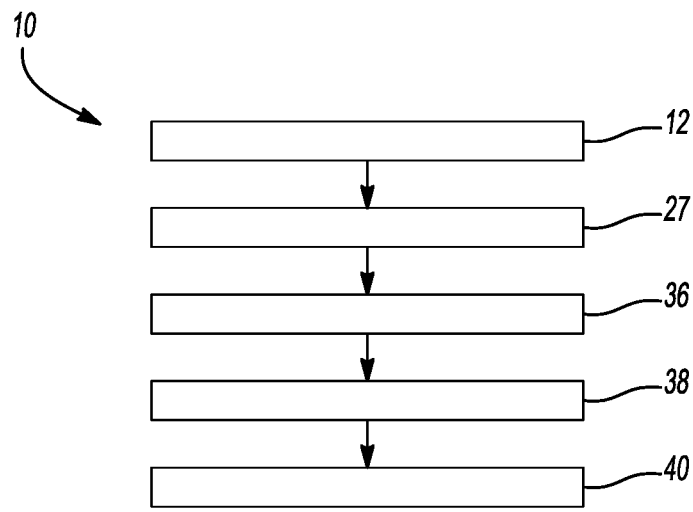
FIG. 1 is a flowchart depicting a method of preparing a sulfide-impregnated solid-state battery in accordance with one example of the disclosure.
Figure 2A:
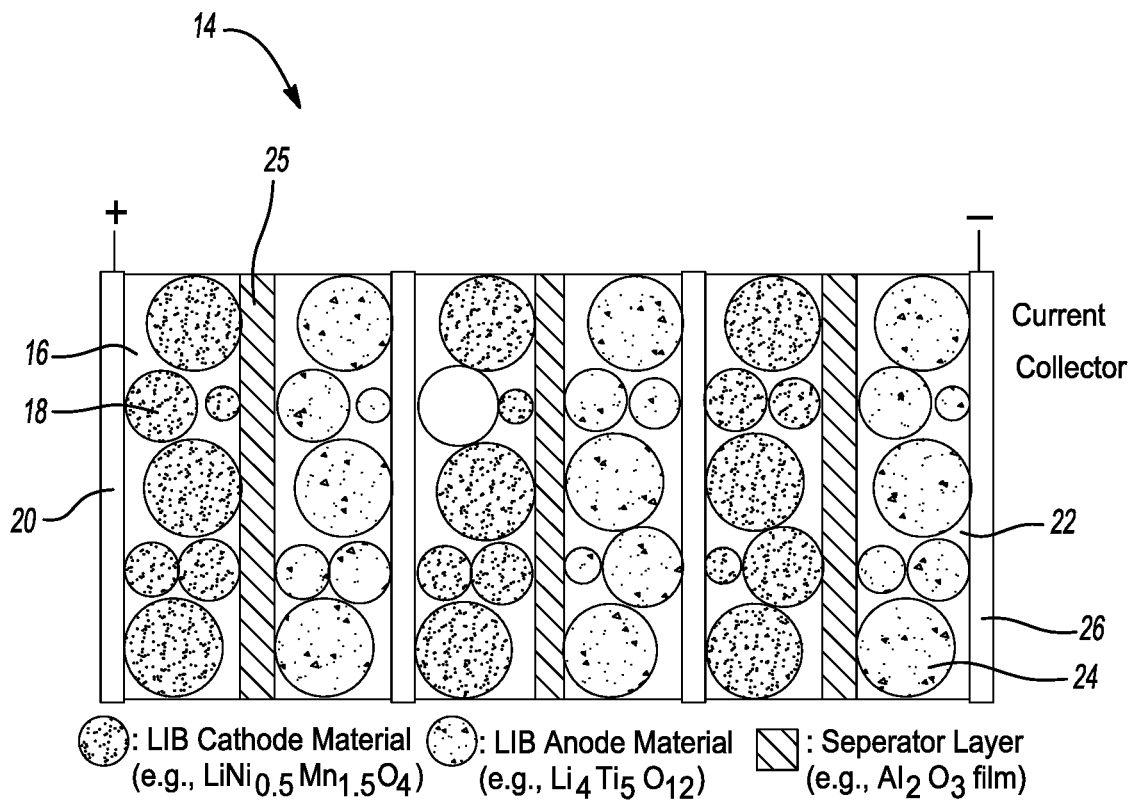
FIG. 2A is a cross-sectional view of a conceptual image of a bipolar cell core provided to prepare a sulfide-impregnated solid-state battery of FIG. 1.

Referring to FIGS. 1-2A, a method 10 of making a sulfide-impregnated solid-state battery is provided. As shown, method 10 comprises a step 12 of providing a cell core 14. In this example, the cell core 14 in a bipolar stacking design is provided, as shown in FIG. 2A.

As provided in FIGS. 1-2A, the cell core 14 is constructed by basic cell units. Such basic cell unit may be repeated/connected in parallel or in series (namely, bipolar stacking) to form a cell core to achieve a desired battery voltage, power and energy. The cell core is further partially sealed into the packaging such as the Al laminated film and metal can.

In this embodiment, the cell core 14 (FIG. 2A) includes at least one positive electrode 16 having a cathode layer 18 and a positive current collector 20. Preferably, cathode layer 18 comprises between about 30 wt % and about 98 wt % cathode active material, between about 0 wt % and about 30 wt % conductive additive, and between about 0 wt % and about 20 wt % binder. In this embodiment, the cathode active material may comprise any suitable material such as a high-voltage oxide, a surface-coated high-voltage cathode material, a doped high-voltage cathode material, a rock salt layered oxide, a spinel, a polyanion cathode, a lithium transition-metal oxide, or mixtures thereof. In one embodiment, the cathode active material comprises $LiNi_{0.5}Mn_{1.5}O_4$, $LiNbO_3$-coated $LiNi_{0.5}Mn_{1.5}O_4$, $LiCoO_2$, $LiNi_xMn_yCo_{1-x-y}O_2$, $LiNi_xMn_{1-x}O_2$, $Li_{1+x}MO_2$, $LiMn_2O_4$, or $LiV_2(PO_4)_3$, or mixtures thereof.

In one embodiment, the conductive additive of the cathode layer may comprise any suitable material such as carbon black, graphite, graphene, graphene oxide, Super P, acetylene black, carbon nanofibers, carbon nanotubes and other electronically conductive additives. Moreover, the binder of the cathode layer may comprise poly(tetrafluoroethylene) (PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS).

Moreover, cathode layer 18 may have a thickness of between about 1 micrometer and about 1000 micrometers. In this embodiment, the positive current collector comprises a conductive material and has a thickness of between about 4 micrometers and about 100 micrometers. The conductive material may comprise aluminum, nickel, iron, titanium, copper, tin, and alloys thereof.

As shown in FIG. 2A, each cell core 14 further includes at least one negative electrode 22 comprising an anode layer 24 and a negative current collector 26. In this embodiment, anode layer 24 preferably comprises between about 30 wt % and about 98 wt % anode active material, between about 0 wt % and about 30 wt % conductive additive, and between about 0 wt % and about 20 wt % binder. Moreover, anode layer 24 may have a thickness of between about 1 micrometer and about 1000 micrometers.

In this embodiment, the anode active material may comprise carbonaceous material (for example, graphite, hard carbon, and soft carbon), silicon, silicon-graphite mixture, $Li_4Ti_5O_{12}$, transition-metal (for example, Sn), metal oxide or sulfide (for example, $TiO_2$, FeS), and other lithium-accepting anode materials.

In one embodiment, the conductive additive of the anode layer may comprise any suitable material such as carbon black, graphite, graphene, graphene oxide, Super P, acetylene black, carbon nanofibers, carbon nanotubes and other electronically conductive additives. Moreover, the binder of the anode layer may comprise poly(tetrafluoroethylene)

(PTFE), sodium carboxymethyl cellulose (CMC), styrene-butadiene rubber (SBR), poly(vinylidene fluoride) (PVDF), nitrile butadiene rubber (NBR), styrene ethylene butylene styrene copolymer (SEBS), styrene butadiene styrene copolymer (SBS).

Preferably, the negative current collector has a thickness of between about 4 micrometers and about 100 micrometers.

The cell core 14 further has a separator layer 25 disposed between the positive electrode 16 and the negative electrode 22. The separator layer 25 is preferably a oxide-based or polymer-based film with porosity of 0-90%. In one embodiment, separator layers 25 may comprise an oxide ceramic powder, e.g., $SiO_2$, $CeO_2$, $Al_2O_3$, $ZrO_2$.

In this example, it is understood that the outermost current collectors in the cell core 14 (FIG. 2) have tabs extending from their top sides. As shown, the current collector 20 is indicated as positively charged as would be during discharge of a battery cell module. As shown in FIG. 2, the current collector 26 is indicated as negatively charged. In this example, the other current collectors are shared by both the cathode and anode layers as shown in FIG. 2. It is further understood that prior to the introducing step 27, a step of pre-pressing the cell core 14 may occur. Such pre-pressing step may be achieved by any suitable manner. For example, the step of pre-pressing comprises pressing the cell core between about 2 MPa and about for about 2 min to about 12 hrs.

Figure 2B:
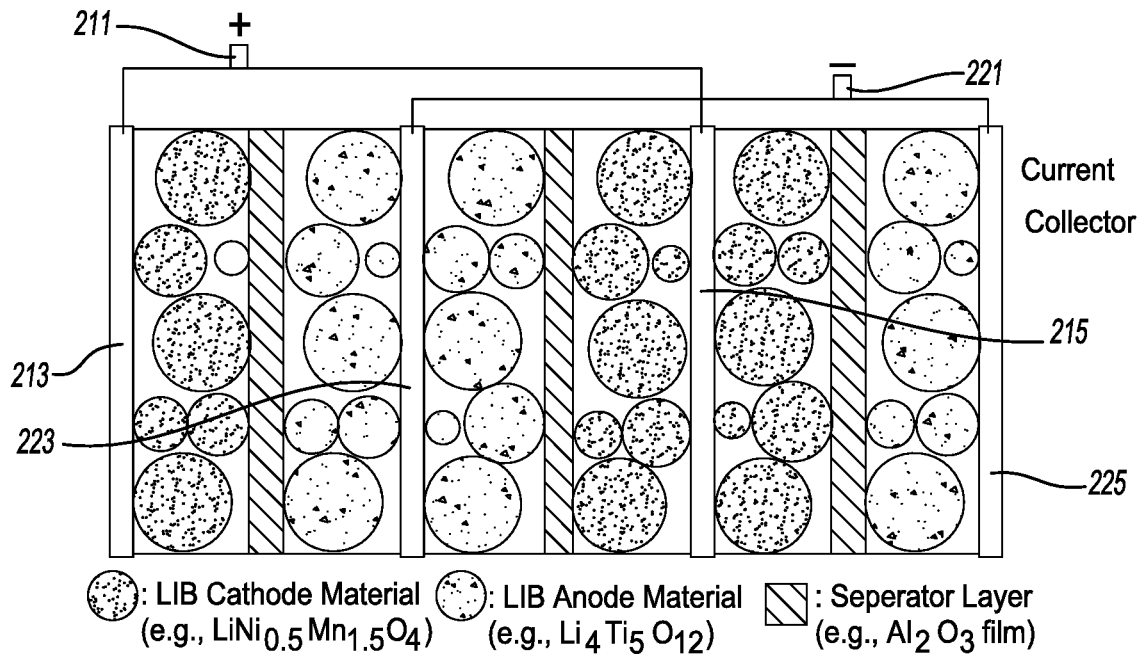
FIG. 2B is a cross-sectional view of a conceptual image of a cell core with parallel-connected cell units provided to prepare a sulfide-impregnated solid-state battery of FIG. 1

It is understood that the cell cores may be arranged in any other suitable manner such as a parallel-connected stacking design as illustrated in FIG. 2B. As shown, each cell core may be comprised of a plurality of cell units that are connected in a parallel-stacked battery cell core. The current collectors have tabs extending therefrom. As shown in FIG. 2B, tab 211 along with current collectors 213, 215 are electrically connected and indicated as positively charged as during discharge of the solid-state battery cell module. Tab 221 along with current collectors 223, 225 are electrically connected and indicated as negatively charged.

Figure 3:
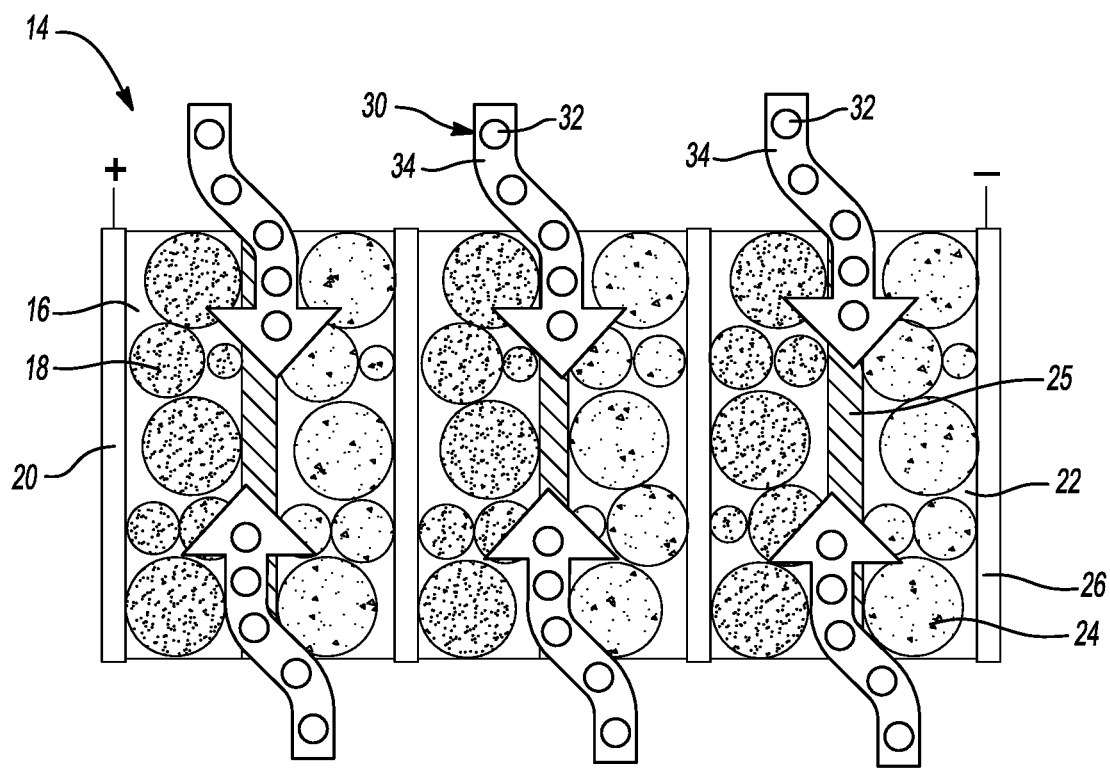
FIG. 3 is a cross-sectional view of a conceptual image of introducing a sulfide solid-state electrolyte precursor solution in the cell core of FIG. 2A.
Figure 4:
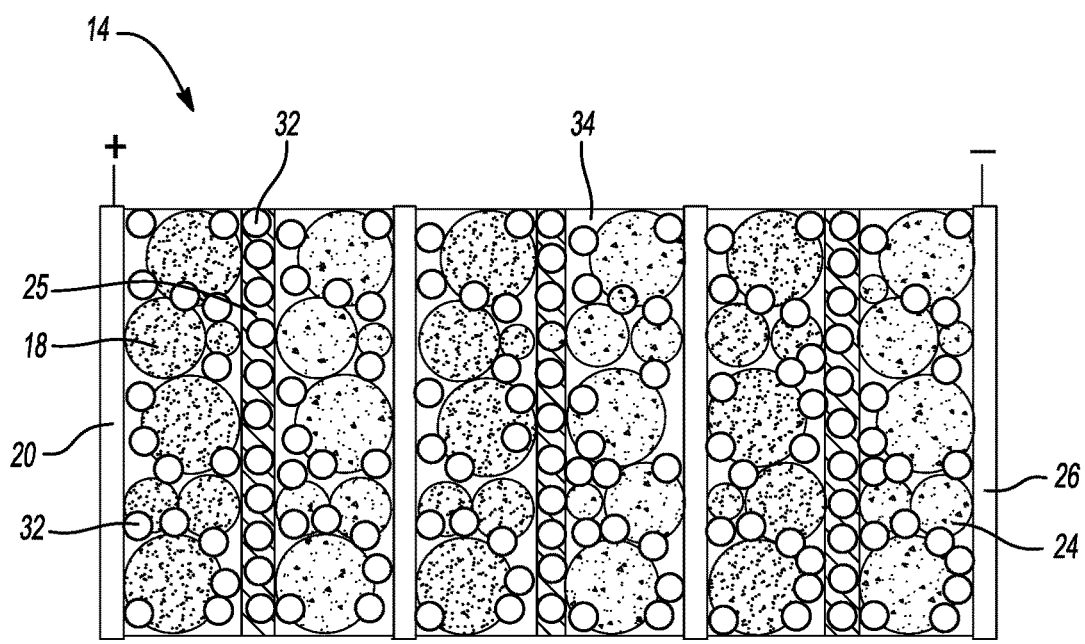
FIG. 4 is a cross-sectional view of a conceptual image of the cell core after the step of introducing sulfide solid-state electrolyte precursor solution in FIG. 3.

As shown in FIGS. 1 and 3, the method 10 further comprises a step 27 of introducing a sulfide solid-state electrolyte (S-SSE) precursor solution 30 in the cell core 14. As depicted in FIG. 4, precursor solution is dispersed within the porous structures of cathode layer 18, anode layer 24, and separator layer 25.

In this embodiment, the S-SSE precursor solution 30 comprises a sulfide-based solid electrolyte 32 and a solvent 34. Step 27 of introducing the S-SSE precursor solution in the cell core may be achieved in any suitable manner. For example, the S-SSE precursor solution may be injected in the cell core. Alternatively, the cell core may be dipped in S-SSE precursor solution to introduce the S-SSE precursor solution in the cell core.

In one example, the S-SSE precursor solution comprises a $Li_6PS_5Cl$-ethanol solution. In another example, the S-SSE precursor solution comprises at least one of a pseudobinary sulfide, a pseudoternary sulfide, and a pseudoquaternarysulfide dissolved in solvent. In this aspect, the pseudobinary sulfide comprises one of $Li_3PS_4$, $Li_7P_3S_{11}$, $Li_4SnS_4$, and $80Li_2S.20P_2S_5$. The pseudoternary sulfide may comprise one of $Li_{3.25}Ge_{0.25}P_{0.75}S_4$, $Li_6PS_5Br$, $Li_6PS_5Cl$, $Li_7P_2S_8I$, $Li_4PS_4I$, and $LiI—Li_4SnS_4$.

Further, the pseudoquaternary sulfide may comprise one of $Li_{9.54}Si_{1.74}P_{1.44}Si_{1.7}Cl_{0.3}$ and $Li_{10.35}[Sn_{0.27}Si_{1.08}]P_{1.65}S_{12}$. The solvent may comprise at least one of a tetrahydrofuran, ethyl propionate, ethylacetate, acetonitrile, water, N-methyl formamide, methanol, ethanol, and 1,2-dimethoxyethane. In some examples, to improve the S-SSE dispersibility, some dispersants (such as Triton X-100) are further added into S-SSE precursor solution.

Figure 5:
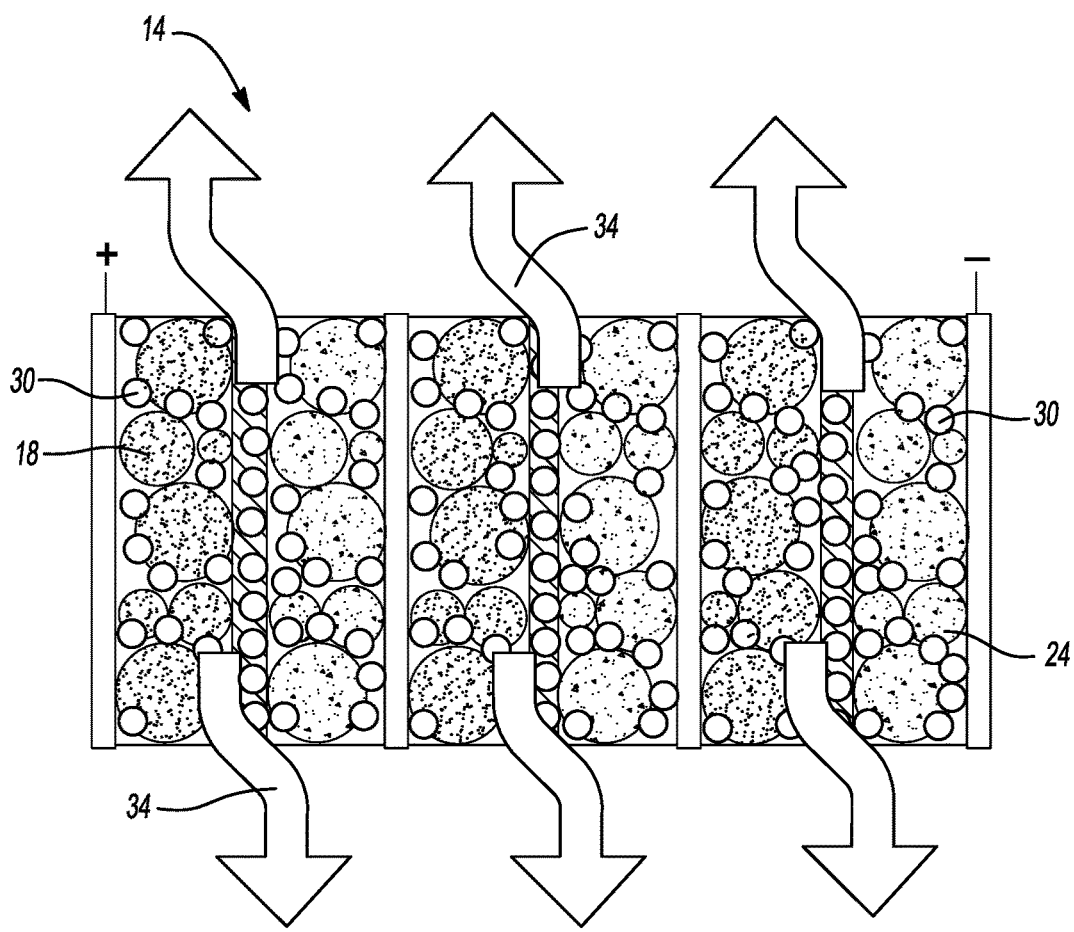
FIG. 5 is a cross-sectional view of a conceptual image of evaporating a solvent from the cell core of FIG. 4.

As depicted in FIGS. 1 and 5, method 10 further comprises a step 36 of evaporating solvent 34 from the cell core 14 to dry the cell core and solidify the sulfide-based solid-state electrolyte 32 within the cell core 14. In this example, cell core 14 is heated between about 60 degC and about 600 degC under vacuum for about 30 minutes to about 120 hours. Preferably, the drying temperature should be higher than the boiling point of solvents. During heating, solvent 34 is evaporated from cell core 14 as shown in FIG. 5. Preferably, cell core 14 is heated at about 180 degC under vacuum for about 6 hours, thereby evaporating solvent 34 from the cell core 14, when using ethanol as solvent. Thus, during step 36, cell core 14 is dried and the sulfide-based solid-state electrolyte is precipitated out and solidified within the pores of the cell core. It is understood that the step 36 of evaporating may occur under no vacuum. It is further understood that prior to the evaporating step 36, a step of vibrating the cell core may occur to improve the wettability of the S-SSE precursor solution 30. The vibrating step may be achieved by any suitable manner.

Figure 6:
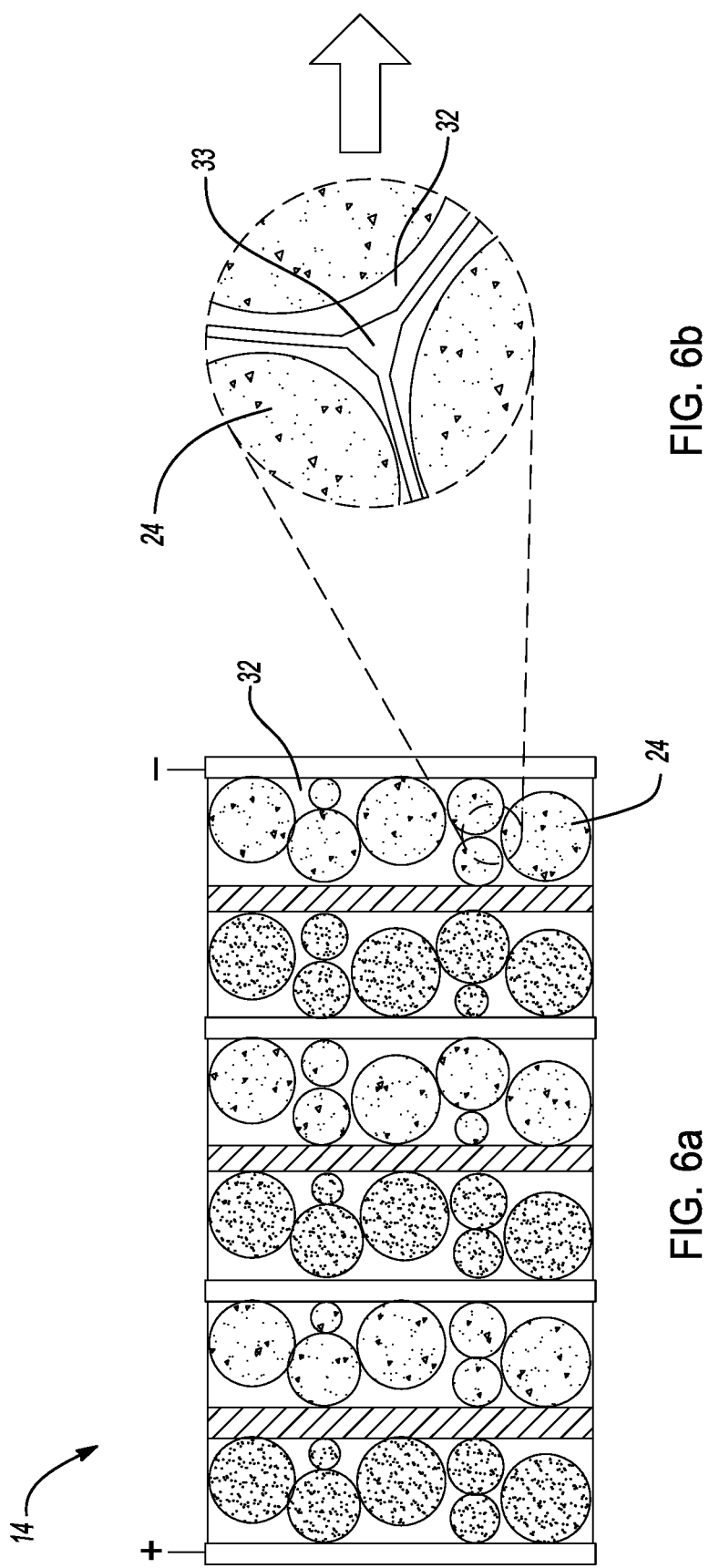

FIGS. 6a-6b depict cell core 14 after the step of evaporating the solvent therefrom as discussed above. As shown in FIG. 6a, cell core 14 comprises solidified sulfide-based solid-state electrolyte 32 dispersed within the pore structures of cell core. FIG. 6b illustrates magnified cross-sectional view of the anode layer 24, where sulfide-based solid-state electrolyte 32 has grown or dispersed onto the surface of anode active material particles and pore 33 still exists.

As depicted in FIG. 1, method 10 further comprises a step 38 of pressurizing cell core 14 to densify the cell core thereby densifying the solid sulfide-base electrolyte within the cell core 14 and eliminating the pore 33. In this example, step 38 comprises pressurizing cell core 14 between about 2 MPa and about 800 MPa at about 10 C to about 300 C for about 2 minutes to about 12 hours to densify the solid sulfide-base electrolyte within the cell core. In another example, the cell core is pressurized at greater than about 360 MPa.

Figure 7:
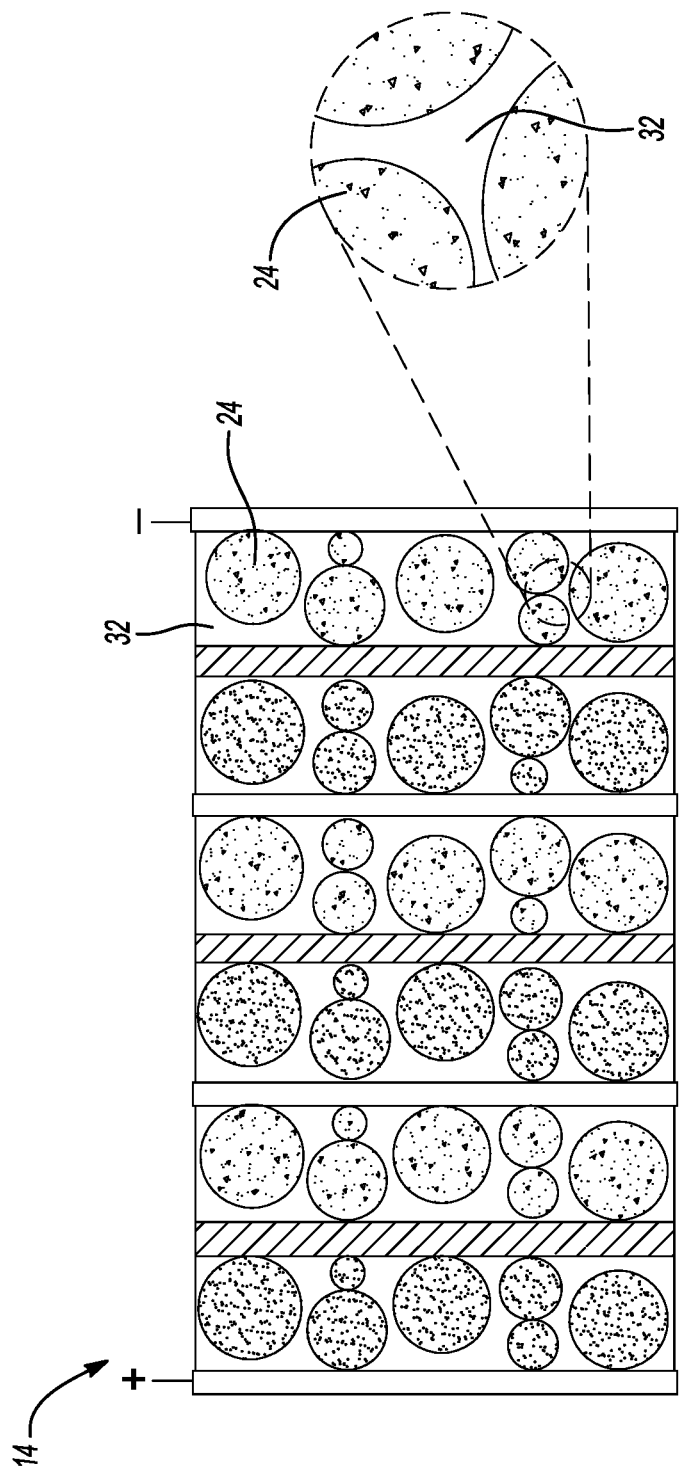

FIGS. 7a-7b depict cell core 14 after step 38 of pressurizing thereby densifying sulfide-based solid-state electrolyte 32 as discussed above. As shown FIG. 7a, cell core 14 comprises densified sulfide-based solid-state electrolyte 32 FIG. 7b illustrates magnified cross-sectional view of the anode layer 24 after densification, where densified sulfide-based solid-state electrolyte 32 fills the space between the anode active material particles. As shown, due to pressurization, there is no pores or less pores within the cell core.

Furthermore, method 10 further comprises a step 40 of fully sealing the cell core. In this example, cell core 14 may be sealed in any suitable manner. For example, the cell core may be fully sealed by way of vacuum seal thereby preventing exposure to air. Thus, the cell core may be placed in an aluminum laminated bag, can or container, and followed by fully vacuum sealing.

FIG. 8 depicts a method 110 of making a sulfide-impregnated solid-state battery in accordance with another example. Method 110 comprises the steps of method 10 in FIG. 1. For example, method 110 comprises a step 112 of providing a cell core and partially sealing into the packaging such as the Al laminated film and metal can, a step 120 of introducing a sulfide solid-state electrolyte precursor solution, a step 136 of evaporating the solvent from the cell core, a step 144 of pressurizing the cell core, and a step 150 of fully sealing the cell core. As shown, after step 136 of evaporating, the method further comprises a step 138 of introducing additional S-SSE precursor solution to the cell core and a step 140 of evaporating the solvent from the cell core to dry the cell core to solidify the sulfide-based solid-state electrolyte within the cell core. In some embodiments, steps 138 and 140 may be repeated.

FIG. 9 illustrates a method 210 of making a sulfide-impregnated solid-state battery in accordance with another example. Method 210 comprises the steps of method 10 in FIG. 1. For example, method 210 comprises a step 212 of providing a cell core and partially sealing into the packaging such as the Al laminated film and metal can, a step 220 of introducing a sulfide solid-state electrolyte precursor solution, a step 236 of evaporating the solvent from the cell core, a step 244 of pressurizing the cell core, and a step 250 of sealing the cell core. As shown, after step 244 of pressurizing, the method 210 further comprises a step 246 of introducing a sulfide solid-state electrolyte precursor solution, a step 248 of evaporating the solvent from the cell core, and a step 249 of pressurizing the cell core. In some embodiments, steps 246, 248, and 249 may be repeated. In a preferred example, the step 246 of introducing a sulfide solid-state electrolyte precursor solution, the step 248 of evaporating the solvent from the cell core, and the step 249 of pressurizing the cell core may be repeated at least twice.

FIG. 10 illustrates a method 310 of making a sulfide-impregnated solid-state battery in accordance with another example. As shown method 310 comprises a step 312 of providing a cell core and partially sealing into the packaging such as the Al laminated film and metal can, a step 320 of introducing a sulfide solid-state electrolyte precursor solution and a step 350 of sealing the cell core. Additionally, after step 320 of introducing, method 310 further comprises a step 325 of simultaneously evaporating the solvent from the cell core and pressurizing the cell core to densify the solid sulfide-base electrolyte.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A sulfide-impregnated solid-state battery comprising:
   a cell core including a plurality of cell units, each cell unit of the plurality of cell units comprising:
   a positive electrode comprising a cathode layer and a positive current collector;
   a negative electrode comprising anode layer and a negative current collector;
   a separator layer disposed between the positive electrode and the negative electrode, the separator being a permeable aluminum oxide film; and
   a densified sulfide-based solid-state electrolyte disposed within the anode layer, wherein the densified sulfide-based solid-state electrolyte fills space between anode active layer material particles and is dispersed in pore structures of cell core.

2. The battery of claim 1 wherein each cell unit of the plurality of cell units is connected in one of parallel arrangement and bipolar arrangement to achieve a desired battery voltage, power and energy.

3. The battery of claim 1 wherein positive current collector has a thickness of between about 4 micrometers and about 100 micrometers and wherein the negative current collector has a thickness of between about 4 micrometers and about 100 micrometers.

4. The battery of claim 1 wherein the cathode layer comprises between about 30 wt % and about 98 wt % cathode active material, between about 0 wt % and about 50 wt % solid electrolyte, between about 0 wt % and about 30 wt % conductive additive, and between about 0 wt % and about 20 wt % binder, and
   wherein the anode layer comprises between about 30 wt % and about 98 wt % anode active material, between about 0 wt % and about 50 wt % solid electrolyte, between about 0 wt % and about 30 wt % conductive additive, and between about 0 wt % and about 20 wt % binder.

5. The battery of claim 1 wherein each of the cathode layer and the anode layer has a thickness of between about 1 micrometer and about 1000 micrometers.

6. The battery of claim 4 wherein the cathode active material comprises $LiNi_{0.5}Mn_{1.5}O_4$, $LiNbO_3$-coated $LiNi_{0.5}Mn_{1.5}O_4$, $LiCoO_2$, $LiNi_xMn_yCo_{1-x-y}O_2$, $LiNi_xMn_{1-x}O_2$, $Li_{1+x}MO_2$, $LiMn_2O_4$, or $LiV_2(PO_4)_3$, or mixtures thereof.

7. The battery of claim 4 wherein the anode active material comprises carbonaceous material (e.g. graphite, hard carbon, soft carbon etc.), silicon, silicon mixed with graphite, $Li_4Ti_5O_{12}$, transition-metal (e.g., Sn), metal oxide/sulfide (e.g., $TiO_2$, FeS and the likes), or mixtures thereof.

* * * * *